Patented Dec. 13, 1938

2,139,955

UNITED STATES PATENT OFFICE 2,139,955

COLORED GLASS COATED REFRACTORY GRANULES

Carl E. Hillers, Charlottesville, and Horatio L. Small, Esmont, Va., assignors to Blue Ridge Slate Corporation, Charlottesville, Va., a corporation of Virginia No Drawing. Application March 17, 1937, Serial No. 131,373

7 Claims. (Cl. 91—70)

This invention relates to new and useful improvements in glazed or glass-coated refractory granules and a method of coating the surfaces of refractory granular material with a layer of materials capable of being converted by heat into a colored glaze. The colored granular product is useful as a surfacing for asphaltic shingles or other artificial roofing and the like.

This application is a continuation in part of our application Serial No 16,610, filed April 16, 1935.

As a base for our colored granules, we use crushed flint or silica pebbles or crushed quartz. The pebbles or mineral are crushed by any of the well-known methods employed in the industry, and then screened. The screening operation is carried out to produce granular material free from dust and "fines" and also free from coarse particles. For our process and purpose, we prefer that portion of the crushed material which will pass through screens with openings 0.065 inch square, but which will be retained by screens with openings 0.0232 inch square. However, this sizing may be modified somewhat, or other sizings may be used without departing from the spirit of our invention.

In color coating such granular material, we proceed as follows to produce green coatings on the granules.

To one ton of granules we add 80 pounds of aqueous sodium silicate of specific gravity 1.42, factor 1Na$_2$O, 325 SiO$_2$ and mix for about two minutes, more or less. The mixing is preferably done in a so-called Stedman mixer consisting of an an open top circular pan revolving on a perpendicular axis and having two diametrically opposite sets of revolving mixer blades and a centrally located discharge opening. We then add 15 pounds of dry, powdered litharge, 8 pounds of dry powdered borax and from 10 to 20 pounds of dry chrome oxide powder, and continue the mixing for another 4 to 10 minutes. The resulting product of this mixing procedure we shall refer to as "unheated coated granules".

We then introduce these unheated coated granules into a heating device and raise the temperature to 1600–1850° F., or to 1700–1800° F. The heating device is preferably so constructed that either the granular material is agitated during the heating or the granular material is exposed to the heat in thin layers, in order to insure uniform heating of the mass and particles. For the high temperatures used, it is well to have the heating device lined with refractory material. At a temperature of approximately 1300° F., the coating on the granules will begin to melt or liquefy, causing the mass to become sticky, but in the higher temperature range we have specified, each individual granule becomes surrounded with a film of liquid glass containing dissolved and dispersed coloring matter, and heaps or mounds of such liquid-bearing granules tend, while red-hot, to slump gradually or slowly flow as if the entire mass were a viscous liquid. Actually, however, the granular nuclei will still be found to be solid and very little changed This slumping action is due, apparently, to the liquid layer surrounding the granules, which acts somewhat as a lubricant between the surfaces, but it is not characteristic of all melted glasses. Contact between separate granules is not complete or of the all over type. The impression conveyed is of a viscous liquid, but there are voids in a mass of such hot liquid-carrying granules which are not filled eiter by liquid or by the solid granules.

When this mass is cooled, either in air in thin layers or by water, the voids create additional strain points during the cooling, and separation of the mass into individual coated granules or small, loosely bound clusters occurs. When cool, such granules are bright in color, and appear to the naked eye to be uniformly coated. The chrome oxide is partly dissolved and partly dispersed in the coating layer.

We find that best results are obtained by using the above given proportions of the ingredients on certain types of white silica granules, but some of the advantages of our coloring method will be observed even with the proportions varied somewhat from those shown in the example. Furthermore, other oxides of lead may be used in place of or in partial substitution for the litharge, such as minium or red lead and lead dioxide, without departing from the spirit of our invention. However, such other oxides are usually more expensive than litharge, and we consequently pefer to use litharge.

Other modifications of our example which we have tried and found to work satisfactorily include—

1. Increasing or decreasing the amount of aqueous sodium silicate and the use of sodium silicate solutions of other concentrations and factors.

2. Partial replacement (up to 20 pounds) of the aqueous sodium silicate of the example by water.

3. Increasing slightly or decreasing slightly the amount of borax.

4. The use of powdered metallic lead in place of an oxide of lead.

5. The use of barium carbonate in partial substitution for lead or an oxide of lead. We prefer to replace part of the lead or lead oxide on an approximately equal weight basis, more or less, by the barium carbonate, although substitution may be made upon the basis of chemically equivalent quantities.

6 The use of other coloring agents besides chrome oxide, either alone or in combinations.

The heating treatment is preferably conducted as a continuous process, using an inclined rotary kiln with a gas or oil burner as a source of heat. However, we have successfully conducted the heating operation as a batch process using both rotary and stationary furnaces. In the latter case, some stirring or agitating device is necessary to prevent non-uniform heating of the unheated coated granules.

The temperature of the granules during the heat treatment we determine by the use of an electrical or optical pyrometer.

Cooling of the coated granular material after the heat treatment may be accomplished by spraying a stream of water directly onto the red-hot granules, or by cooling in air or in pipes surrounded by water, etc., or by a combination of water and air cooling.

In place of the Stedman mixer mentioned in the example, a portable or stationary concrete mixer, or any device producing approximately the equivalent mixing may be used. The length of time employed or consumed in the mixing operation may be varied. Good coverage of the granules by the wet and dry materials entering into the coating is the objective desired and, although the length of time necessary to produce good coverage will vary in different mixing devices, little is to be gained by continuing the mixing after the objective has been attained.

It is further possible to dry the unheated coated granules either partially or completely before introducing them into the heat treating device. This may assist in increasing the productive capacity of a manufacturing unit and achieve economy in fuel consumption.

When barium carbonate is used in partial replacement for a portion of the lead or lead oxide, we find that the appearance of the finished colored granules is usually better than if lead or lead oxide is used without any barium carbonate. This improvement is desirable and may be due to the well known effect on the melting point and the fluidity of the melted glass coating which results when a plurality of metallic oxides of certain types are used instead of a single metallic oxide. In this connection we consider the barium carbonate in terms of its barium oxide content, since the carbonate is decomposed when the coating ingredients are brought into the fused condition, and carbon dioxide is evolved. Glaze coated granules made by the method of this invention show no signs of carbonates in the glaze when treated with acids, even though part or all of the lead or lead oxide of the example has been originally replaced by barium carbonate. Our glazed granules are entirely non-blooming, which is a very desirable feature. By contrast, if barium sulfate or barytes be substituted for the lead or lead oxide, glazed granules which bloom are produced, and the glaze contains sulfates in water soluble form.

All the compounds of lead, as well as the lead itself, and the barium carbonate which we use in our process are insoluble in water and non-reactive with sodium silicate in aqueous solution at atmospheric temperatures, and during the mixing and early stages of the heating treatment no formation of lead silicate or lead borosilicate or the corresponding barium compounds occurs. The ingredients react to form the weather resistant coating of lead silicate or borosilicate at approximately the melting temperature or higher. Consequently, the adhesiveness of the sodium silicate is effective throughout the drying (if the unheated coated granules are dried as a separate step) and the early stages of the heat treating in binding the lead or lead compound and borax and coloring compound to the granular base. Thus the otherwise usual losses of expensive coloring compounds, as well as coating ingredients, are avoided. The "coverage" or hiding of the granular base, which is accomplished during the mixing process, is efficiently maintained throughout to the finished granule. Where soluble compounds capable of reacting with or precipitating sodium silicate from aqueous solutions are employed, the loss of adhesion in the sodium silicate due to dilution by water and reaction with, e. g., lead acetate, results in very appreciable losses of coloring agent before fluxing occurs.

We have adhered to commercial practice in describing aqueous sodium silicates as "solutions" although we are aware that some of them, at least, might more properly be described as "dispersions." It will be evident that much of the economy and efficiency of our process would be lost if we were to replace our strongly adhesive sodium silicate solution by a non-adhesive combination of water and the poorly soluble dry, powdered solid sodium silicate.

The "oxide method" described by A. I. Andrews on page 50 of his text-book "Ceramic Tests and Calculations" may be used to represent the formula of the glaze compositions produced by fusion of the coating ingredients on the surfaces of the granules in the process of this invention. The highly desirable glazed coating on the granules which we obtain by replacing seven pounds of the litharge of our example by eight pounds of barium carbonate may be considered to have the following composition, 16.5% PbO, 12.8% BaO, 6.0% $B_2O_3$, 15.4% $Na_2O$, 49.3% $SiO_2$, disregarding the coloring oxide. Fusion of a portion of the granular refractory mineral base may modify these compositions slightly by increasing the $SiO_2$ percentage at the expense of the other oxides.

In the description of the effect of heat upon our uncoated heated granules, we mentioned a slumping tendency while the granules were in the red-hot condition. The presence of the oxides of certain other metals besides those we use, may seriously reduce the slumping tendency and result in granules which, when red-hot, stick to the walls of the heating device instead of slowly and cleanly slumping away therefrom. Calcium, magnesium, aluminum and zinc compounds, among the more common glass or glaze components, reduce the slumping tendency and are therefore to be avoided. Likewise, high percentages of $SiO_2$ act similarly. Such materials are not equivalents of the litharge or barium carbonate (of our invention), and should not be substituted therefore except at a loss of desirable commercial manufacturing properties.

It will be evident that our coating composition need not be applied as a slurry and that sodium silicate is an essential ingredient of our coating. The sodium silicate cannot be replaced by organic glues and the like to produce a comparable coating, unless the proportions of our lead compound and borax were considerably increased, and this we do not contemplate because part of the economy of our process would be lost.

What is claimed is:

1. The process of coating granules of refractory material comprising the following steps: applying to the granules sodium silicate in an aqueous dispersion, then applying to the granules borax, coloring agent, a water insoluble form of lead and barium carbonate, all in the dry state, heating to a temperature of 1600-1850° F., and finally cooling.

2. The method of forming a non-blooming glaze coating on the surfaces of refractory mineral granules consisting of, first, mixing on the granules sodium silicate in aqueous dispersion, while still wet mixing on a dry insoluble form of lead, dry powdered borax, dry finely ground barium carbonate and dry coloring agent, then heating the granules to drive off volatile material and fuse the coating, and finally cooling the granules.

3. The method of forming a non-blooming glaze coating on the surfaces of refractory mineral granules, consisting of, first, mixing on the granules sodium silicate in aqueous dispersion, while still wet mixing on a dry insoluble form of lead, dry powdered borax, dry finely ground barium carbonate and dry coloring agent, then heating to a temperature in excess of 1600° F. but below a temperature which would cause the granules to fuse together, and finally cooling the granules.

4. As a new article of manufacture, refractory mineral roofing granules having a non-blooming, colored coating consisting of the fusion product of aqueous sodium silicate solution, a dry insoluble form of lead, dry finely ground barium carbonate, dry powdered borax and coloring agent.

5. As a new article of manufacture, refractory mineral roofing granules having a non-blooming glazed coating of the composition, 16.5% PbO, 12.8% BaO, 15.4% $Na_2O$, 6.0% $B_2O_3$, 49.3% $SiO_2$ and coloring oxide.

6. Roofing sheets impregnated and coated with bituminous material and surfaced with the granules of claim 4.

7. Roofing sheets impregnated and coated with bituminous material and surfaced with the granules of claim 5.

CARL E. HILLERS.
HORATIO L. SMALL.